(12) United States Patent
Paris et al.

(10) Patent No.: US 9,503,434 B2
(45) Date of Patent: *Nov. 22, 2016

(54) SINGLE-PASS DATA COMPRESSION AND ENCRYPTION

(71) Applicant: Centri Technology, Inc., Seattle, WA (US)

(72) Inventors: Luis Gerardo Paris, Hershey, PA (US); Michael Patrick Mackey, Lake Stevens, WA (US)

(73) Assignee: Centri Technology, Inc., Seattle, WA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/537,806

(22) Filed: Nov. 10, 2014

(65) Prior Publication Data

US 2015/0067339 A1    Mar. 5, 2015

Related U.S. Application Data

(63) Continuation of application No. 13/671,351, filed on Nov. 7, 2012, now Pat. No. 8,886,926.

(51) Int. Cl.
*H04K 1/00* (2006.01)
*H04L 29/06* (2006.01)
*H04L 9/06* (2006.01)

(52) U.S. Cl.
CPC ......... *H04L 63/0457* (2013.01); *H04L 9/0637* (2013.01); *H04L 63/061* (2013.01); *H04L 2209/30* (2013.01)

(58) Field of Classification Search
CPC ......... H04L 9/28; H04L 9/0631; H04L 9/18; H04N 7/1675; H04N 21/23476; G11B 20/00007
USPC ....................................................... 380/217
See application file for complete search history.

(56) References Cited

U.S. PATENT DOCUMENTS 5,987,792 A     11/1999   Reyes-Paris
6,157,720 A *   12/2000   Yoshiura et al. ............... 380/44

(Continued)

FOREIGN PATENT DOCUMENTS

WO        2010144123 A1    12/2010

OTHER PUBLICATIONS

International Search Report and Written Opinion for International Application No. PCT/US2013/068798, mailed on Mar. 19, 2014.

*Primary Examiner* — Ali Abyaneh
(74) *Attorney, Agent, or Firm* — John W. Branch; Lowe Graham Jones PLLC

(57) ABSTRACT

Embodiments compress and encrypt data in a single pass to reduce inefficiencies that occur from compression and encrypting data separately. Typically, compression and encryption are implemented in separate functional units. This has a few disadvantages: 1) encryption cannot make use of compression state to further secure the message, 2) processed data is read and written twice, 3) additional space, time, and resources are consumed, and 4) it is more prone to potential cipher-attacks since the encryption stage is independent from compression. Embodiments overcome these disadvantages by structuring these operations so that both compression and encryption is executed within the same processing loop. Thus: 1) encryption is stronger due to the dependence on the compression state, 2) I/O buffers are accessed only once reducing overhead, 3) system footprint is reduced, and 4) cipher analysis is more complex since the decryption process cannot be separated from the decompression process.

28 Claims, 12 Drawing Sheets

(56) References Cited

U.S. PATENT DOCUMENTS

| | | |
|---|---|---|
| 7,436,330 B2 | 10/2008 | Paris |
| 8,085,171 B2 | 12/2011 | Paris |
| 8,386,800 B2* | 2/2013 | Kocher et al. .............. 713/189 |
| 8,457,311 B1* | 6/2013 | Schultz et al. .............. 380/210 |
| 8,533,456 B2* | 9/2013 | Kholidy .................... 713/153 |
| 2004/0218760 A1 | 11/2004 | Chaudhuri |
| 2008/0122665 A1 | 5/2008 | Paris |
| 2008/0208886 A1 | 8/2008 | Zhang |
| 2009/0077109 A1 | 3/2009 | Paris |
| 2009/0190760 A1 | 7/2009 | Bojinov |
| 2010/0067686 A1* | 3/2010 | Minematsu .................. 380/28 |
| 2010/0268960 A1 | 10/2010 | Moffat |

* cited by examiner

SINGLE-PASS DATA COMPRESSION AND ENCRYPTION

CROSS-REFERENCE TO RELATED APPLICATIONS

The present application is a Continuation of patent application Ser. No. 13/671,351, entitled "SINGLE-PASS DATA COMPRESSION AND ENCRYPTION" filed on Nov. 7, 2012, the benefit of the earlier filing date of which is hereby claimed under 35 U.S.C. §120 and 37 C.F.R. §1.78, and which is further incorporated by reference in its entirety.

TECHNICAL FIELD

The invention relates generally to computer automated cryptography and compression for data and more particularly, but not exclusively to cryptographic and compression operations performed in a single pass through data.

BACKGROUND

Vast amounts of data are transmitted and received every day in a variety of contexts, from smartphones to personal computers to backend data servers. Two major concerns with data are the size of data transmitted and privacy of the data. Data transmitted from one endpoint to another may travel through a variety of intermediate networking hardware, such as routers, switches, servers, Internet service providers (ISPs), and so forth. Each intermediate entity is affected by the size of the data, which consumes resources like memory, CPU, network bandwidth, and cache space, and has the opportunity to snoop on or intercept data.

Data compression and encryption are independent technologies designed to alleviate these problems by reducing data size and ensuring data privacy. As soon as encoding and storing digital information became possible, the need for protecting that information from prying eyes also became useful. In addition, since bandwidth and storage are scarce resources for both analog and digital communications, the need for compressing information to use less space also became a needed commodity. The goal of data compression is to represent information in a more compact form that takes less space to store and transmit. A sender compresses data by noticing redundancies in the data, finding patterns in the data, and applying a variety of other well-known techniques. A receiver uses shared knowledge about the compression method used to decompress the data back into its original, pre-transmission form. Compression may occur at the sender, at intermediate entities between the sender and receiver (e.g., TCP header compression), or anywhere else.

On the other hand, the role of encryption is to protect the confidentiality of the message in case it is intercepted during storage or transit. When discussing compression and encryption algorithms, two algorithms are involved: one that encodes the original message into a different representation, and another one that decodes it to reconstruct the original message, often by reversing the process performed by the encoder. Encryption may use a variety of types of ciphers, keys, and other techniques to perform the function of securing data so that only the sender and receiver know the true content. Compression aims to reduce the size of the message so that less data can be stored or transmitted. Encryption attempts to protect the actual information contained in the message. Therefore, encryption typically does not increase or decrease the size of the message, except for a few padding bytes in the last block.

Since compression and encryption serve different goals, both evolved as separate branches within computing and engineering. Therefore, if the application requires both compression and encryption, they are usually performed in separate, sequential stages. Since the encryption stage has the effect of randomizing the original message, compression is performed first, followed by encryption. Otherwise, the message would compress poorly. Since compression and encryption serve different needs, it is rare and difficult to implement both within the same functional unit. They are typically implemented in sequential stages, requiring at least two passes: one during compression, the other one during encryption. On the decoder end, the compressed/encrypted data is decrypted first followed by decompression, in that strict order.

DETAILED DESCRIPTION

Figure 1:
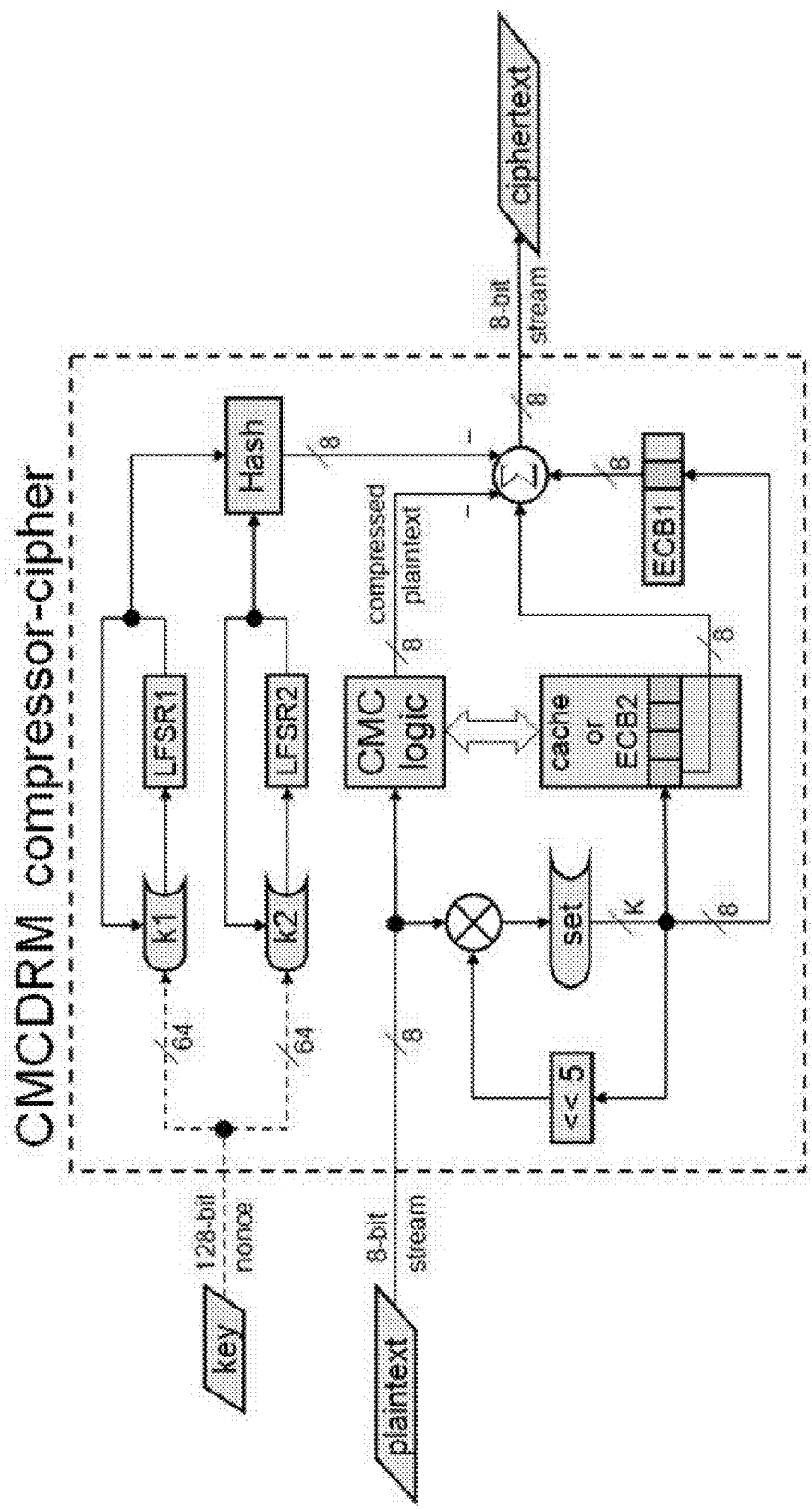
FIG. 1 is a block diagram that illustrates the operation of CMCDRM, the proposed one-pass compressor-cipher, in one embodiment.

A data transmission system is described herein that compresses and encrypts data in a single pass to reduce inefficiencies that occur from compression and encrypting data separately. Typically, compression and encryption are implemented in separate functional units. This has a few disadvantages: 1) encryption cannot make use of compression state in order to further secure the message, 2) processed data is read and written twice, first during compression, then during encryption, 3) additional space, time, and resources are consumed: extra buffers, extra function prolog/epilog code, and 4) it is more prone to potential cipher-attacks since the encryption stage is independent from compression. The data transmission system overcomes these disadvantages by structuring these operations so that both compression and encryption processes are implemented in one functional unit and executed within the same processing loop.

The data transmission system can operate with various well-known and/or proprietary compression and encryption technologies. For example, in one embodiment the system utilizes a cache mapping compression (CMC) technology in combination with a digital rights management (DRM) encryption technology, implemented both in one functional unit (referred to as CMCDRM) to achieve the efficiencies described herein. However, the techniques described herein can also be applied to various compression and encryption technologies to produce similar benefits. The data transmission system provides a technique to merge both compression and encryption seamlessly into one functional, atomic box. The data transmission outperforms previous separate compression and encryption systems by performing: 1) blended compression/encryption, implemented as one functional unit running one workflow, 2) one-pass compression/encryption where input data is compressed and encrypted within the same loop, 3) stronger encryption that is less prone to cryptanalysis since encryption depends on compression state, and 4) lower system footprint with no extra buffering and no additional initialization or register mapping involved.

The data transmission system is a powerful stream compressor and cipher. Implementers can add both compression and encryption to their applications with low overhead and less integration effort as compared to using separate compression and encryption libraries or modules. In addition, due to the awareness of the compression state, it is impossible to split the encryption process from the compression stage in order to facilitate a potential cryptanalysis since both functionalities are performed as an atomic unit. Moreover, system resources are shared and used more efficiently as a standalone compressor-cipher unit, thus avoiding potential processing bottlenecks within the codec. Finally, the proposed one-pass compressor-cipher can be designed as either a hardware or a software artifact. Thus, the data transmission system provides a seamless, efficient compression and encryption solution well suited to mobile platforms and other modern computing environments where judicious use of resources is desirable.

CMCDRM, used as one example of application of the data transmission system herein, is a proprietary stream compressor-cipher system that involves only one pass on the source stream to compress and encrypt the plaintext symbols. Compression is performed using the CMC technology while encryption is implemented using a symmetric key cipher where compressed plaintext symbols are combined with a pseudorandom keystream to generate the ciphertext. CMCDRM uses variations of the following cipher modes during the compression-encryption process: 1) Electronic Codebook (ECB) mode, static and dynamic; and 2) Propagating Plaintext Block Chaining (PPBC) mode.

In some embodiments, the pseudorandom keystream receives a 128-bit nonce key or initialization vector, which provides the first value to two internal keys, k1 and k2, implemented as two 64-bit Galois Linear Feedback Shift Registers (LFSRs) with maximum period. Two ECBs are used in the calculation; the first ECB is static and preset with 256 random symbol values; the second ECB is filled dynamically during the compression-encryption process and includes the actual memory workspace used by the compressor, which can contain up to <Lines×2K> symbols, where Lines and K are constant parameters used by the CMC compression module (e.g., 2 or 4 and 18, 19, or 20, respectively).

FIG. 1 is a block diagram that illustrates the operation of CMCDRM, in one embodiment. ECB2 is used as both a memory workspace during CMC compression and as a dynamic ECB during encryption. Such dependency on both the compression state and the compressed plaintext makes CMCDRM an indivisible functional unit where compression becomes an integral part of encryption. This in turn makes cryptanalysis more difficult by not allowing their physical separation. Also, unlike most ECBs used in cryptography, the ECBs used in CMCDRM do not receive raw plaintext symbols directly, but a function of the current and previous plaintext symbols received, XOR'ed together to perform hashing, and truncated down to K bits in the case of ECB2, the addressing space used by the cache workspace, or truncated down to 8 bits in the case of ECB1.

Figure 2:
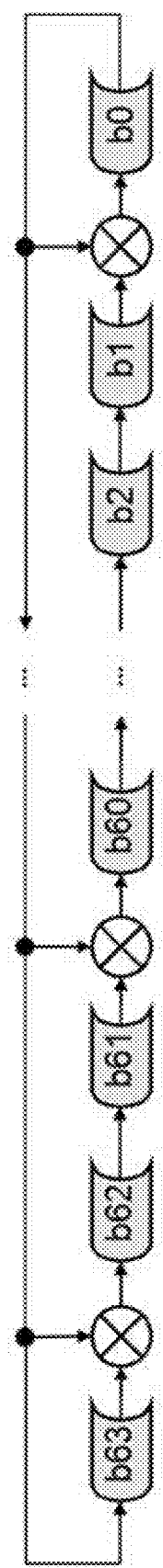
FIG. 2 is a block diagram that depicts the simplified internal operation of the Galois LFSRs used in CMCDRM to generate the pseudorandom keystream, in one embodiment.

FIG. 2 is a block diagram that depicts the simplified internal operation of the Galois LFSRs used in CMCDRM to generate the pseudorandom keystream, in one embodiment. The goal is to self-generate a new random key from the LFSR with each iteration by shifting each bit right, except the tap bits which are XOR'ed first with the least significant bit (LSB) of the LFSR and then shifted right. The result is a pseudorandom sequence of keys that will not repeat until the entire address space of the LFSR is exhausted, that is, if the tap bits are chosen for maximal period.

Figure 3:
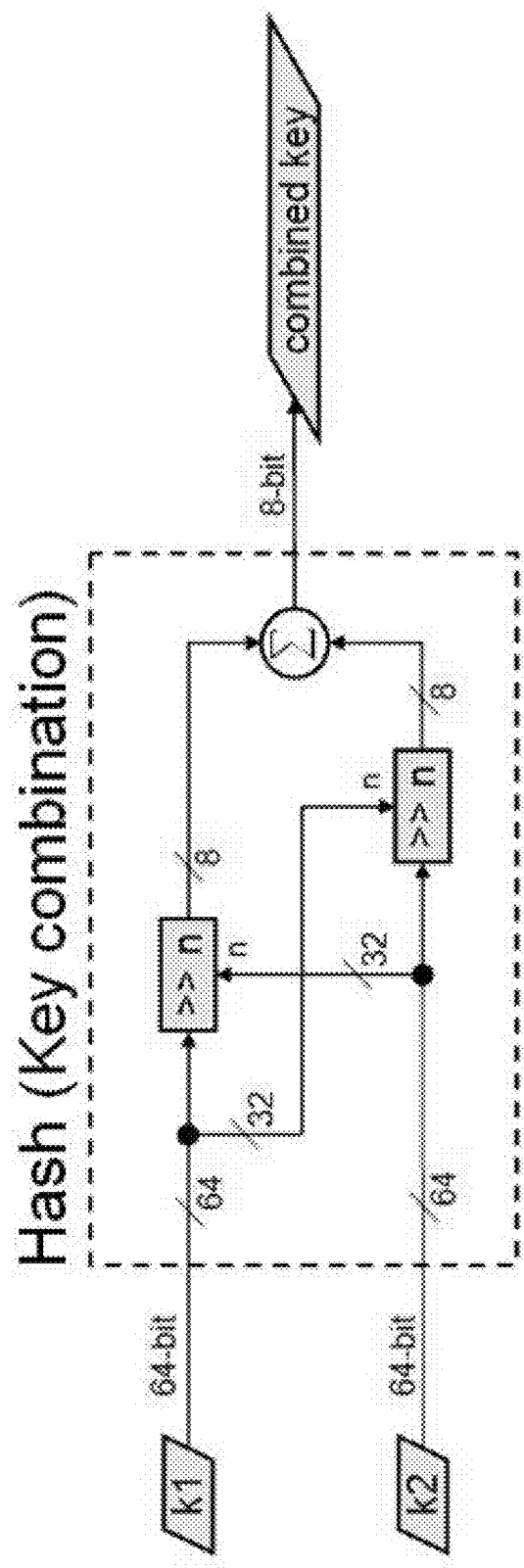
FIG. 3 is a block diagram that illustrates the hash block of CMCDRM, in one embodiment.

FIG. 3 is a block diagram that illustrates the hash block of CMCDRM, in one embodiment. The keys k1 and k2 are shifted right by an amount equal to the lower 32 LSBs of k2 and k1, respectively, and the result subtracted to generate the final combined key. After the keys are generated, their output is combined to generate a non-linear 8-bit value to be used in the final summation of the cipher.

Figure 8:
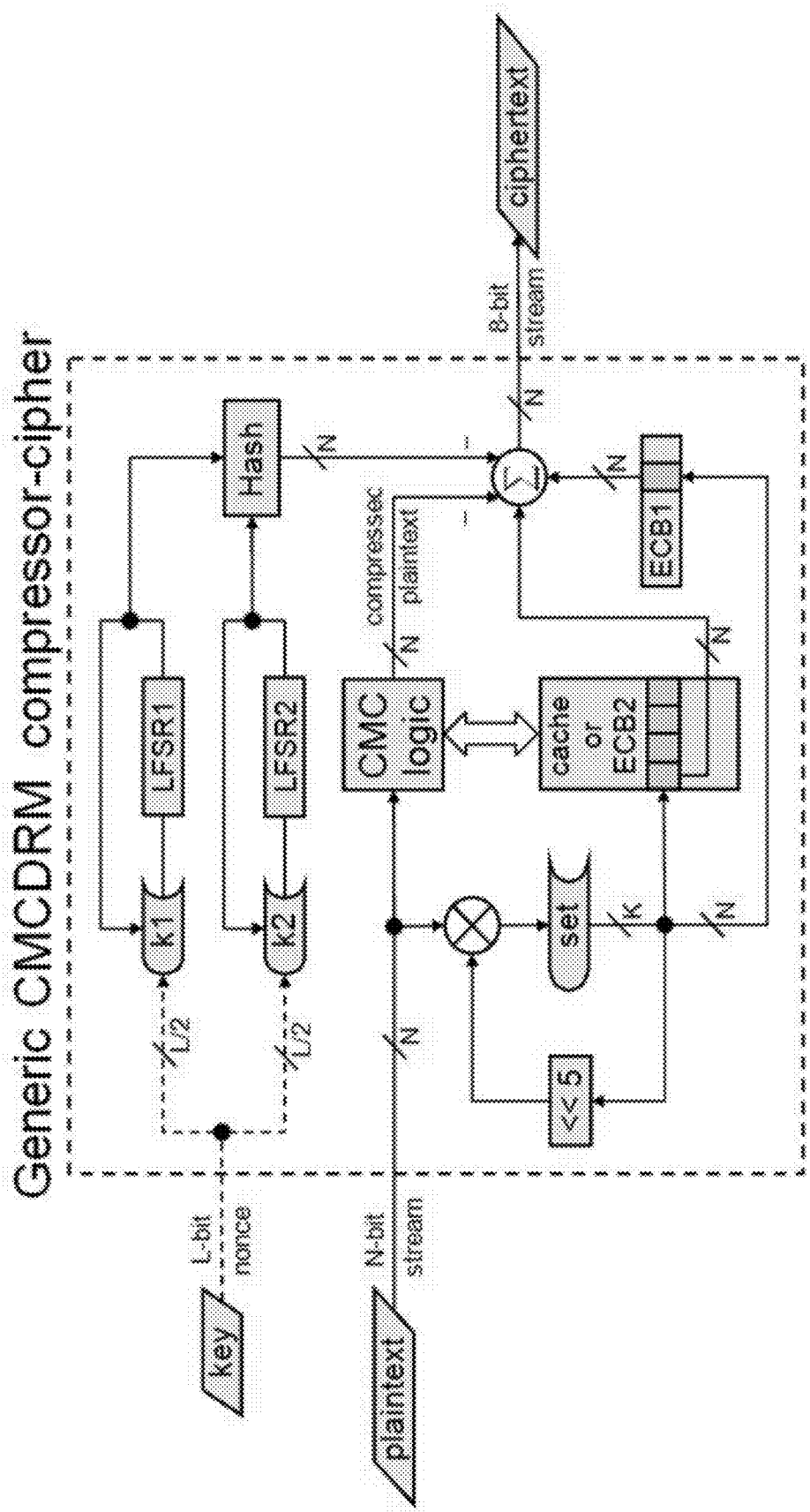
FIG. 8 depicts an embodiment of the CMCDRM system defined using generic values.

FIG. 8 depicts the CMCDRM system defined using generic values. The initial 128-bit key, or nonce, can be redefined using L bits, if the target application requires stronger encryption. The plaintext symbols can be conveniently redefined using N bits, according to the actual symbol size used by the application or the characteristics of the source data stream. Each internal LFSR can be implemented using R bits, where R is the register storage size of the target architecture. The pseudorandom keystream can be implemented using (L/R) parallel LFSRs of R bits each, for a total L-bits key, matching the initial L-bit nonce provided. Thus, the CMCDRM system diagram described above can be specified generically by updating all 8-bit values to N-bits, the 128-bit nonce to an L-bit nonce, then splitting the L-bits key into (L/R) keys, each key connecting to an R-bit LFSR that feeds back to generate the next R-bit key, and finally each R-bit key hashed and recombined into N-bits, the plaintext symbol size. The final summation then adds all N-bit values to generate the final compressed ciphertext N-bit symbol.

Figure 4:
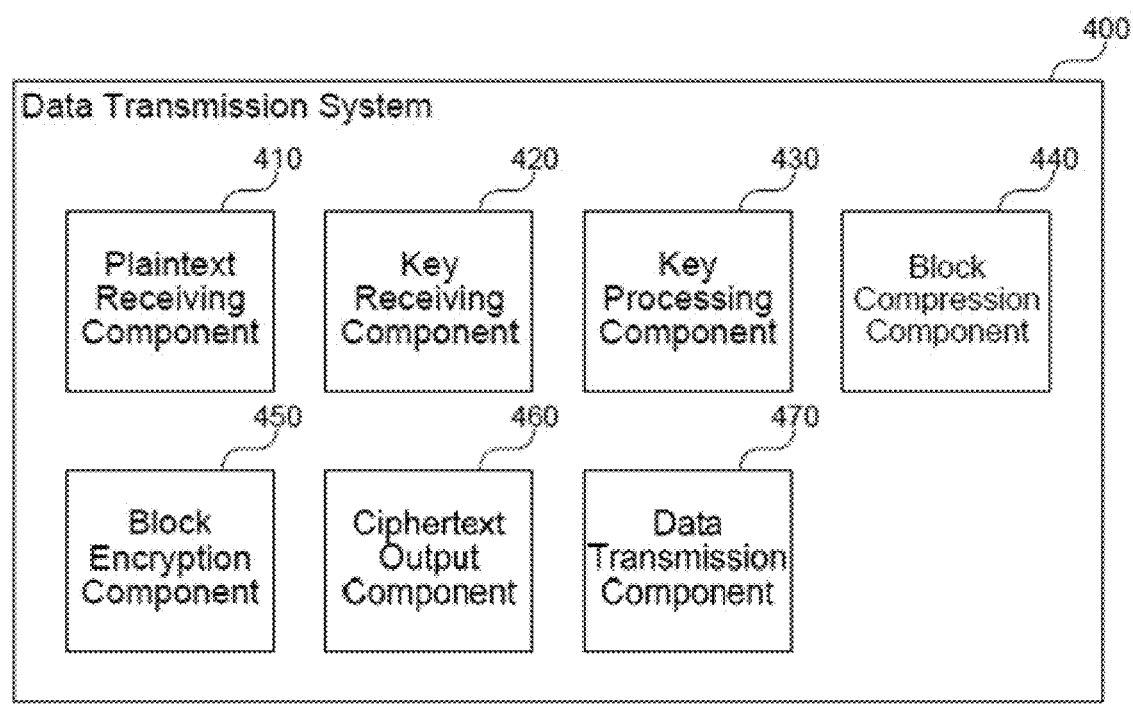
FIG. 4 is a block diagram that illustrates components of the data transmission system, in one embodiment.

FIG. 4 is a block diagram that illustrates components of the data transmission system, in one embodiment. The system 400 includes a plaintext receiving component 410, a key receiving component 420, a key processing component 430, a block compression component 440, a block encryption component 450, a ciphertext output component 460, and a data transmission component 470. Each of these components is described in further detail herein.

The plaintext receiving component 410 receives plaintext input for one-pass compression and encryption. The plaintext may include text, binary data, messages, application data, or any other type of data used in communication between a transmitter and receiver. The component 410 receives input from a digital stream, then feeds each block through the system, where a block is some subcomponent of the stream (e.g., 8 or N-bits of a continuous stream). The component 410 may provide a variety of types of programmatic or other interfaces, such as a web interface, web services interface, object model, exported function, .NET module, or other interface. In typical implementations the system 400 is integrated with a larger software program or hardware components that utilize the system for compression and encryption (or decompression and decryption) of data.

The key receiving component 420 receives one or more cryptographic keys for encrypting the received plaintext input. The key receiving component 420 may receive a key, such as a 128-bit nonce, that the component 420 provides to the key processing component 430 for further processing before combining the key with variants of the input data. The key receiving component 420 may receive various types of cryptographic keys, such as a symmetric or asymmetric key, with which to apply a given encryption cipher in combination with compression.

The key processing component 430 processes the received cryptographic keys in preparation for combining the keys with a compressed version of blocks of the plaintext input. In the example of CMCDRM above, the LFSR and hash blocks represent the key processing performed by the component 430. In many cryptographic algorithms, it is recommended not to use the key directly but rather to apply some level of rolling or encoding of the key to randomize the output and/or make the key harder to extract and/or discover. In the case of asymmetric encryption, the component 430 may receive different keys for encrypting and decrypting data. In such implementations, the transmitter may have a private key that is not shared and a public key that is shared with the receiver for decryption.

The block compression component 440 compresses a block of the received plaintext input using a compression function. The compression function may represent a variety of well-known and/or proprietary compression techniques in the art. Compression generally operates by identifying redundancies in data, detecting patterns, eliminating repeated data, or a combination of these techniques to encode the same information in a smaller space. Compression may be lossless or lossy, where lossless compression allows decompression to achieve the same data as the original input at the receiving side, whereas lossy compression allows for communication of an approximation of the original data, but not necessarily exact recovery of the original data. Whether lossy or lossless compression is used is specific to any particular implementation of the system 400, the types of data used, and the purpose of the data. For example, musical data is often compressed with lossy codecs today whereas binary communication between software components may be expected to be lossless.

The block encryption component 450 (e.g., cryptographic component) encrypts the block of the received plaintext input that is output from the compression function. The system 400 operates block by block on the plaintext input stream, so the each block is compressed and encrypted before moving on to the next block. In some embodiments, the system 400 may operate on multiple blocks in parallel for more efficient data processing. However, the system 400 differs from prior systems in that encryption starts before compression is complete. In other words, compression is not a serial process that completes on an entire data stream or set of the data stream before encryption can begin. Rather, when a single block has been compressed, it can then be encrypted with the data already stored and leveraged from the same registers, data structures, and so forth. Thus, any setup of the data involved in compression and encryption can likely be shared allowing for a single pass over the data and reduced processing and resource consumption overall. The block encryption component 450 combines the compressed block with the processed key to generate a ciphertext block. As block by block of the input plaintext is processed, the resulting output creates a ciphertext stream that corresponds to a compressed and encrypted version of the incoming plaintext stream. Compression and encryption of each block may be performed in parallel for faster processing.

The ciphertext output component 460 outputs one or more ciphertext blocks in a ciphertext stream suitable for transmission to a receiver. The ciphertext output is compressed and encrypted, and emerges block by block as they are compressed and encrypted from the original plaintext input in a single pass fashion. The ciphertext output component 460 may provide a variety of programmatic or other interfaces for providing the ciphertext to other system 400 components. The data transmission component 470 represents a generic example of sending the resulting ciphertext to a receiving endpoint, but other processing or storage of the ciphertext may occur depending on the purpose of any particular implementation of the system 400.

The data transmission component 470 transmits the output ciphertext stream to the receiver. The component 470 may use a variety of well-known or proprietary protocols, such as uniform datagram protocol (UDP), transmission control protocol (TCP), or others. The component 470 may transmit compressed and encrypted ciphertext block by block, in groups of blocks, or in any other manner demanded by a particular implementation. Because the ciphertext is smaller than the plaintext due to compression, the transmission is more efficient than sending the plaintext itself, and is more private due to the encryption provided.

Upon receipt, complimentary components (not shown) at the receiver process the ciphertext to reverse the process and provide the decompressed and decrypted plaintext to the receiver. The receiver receives ciphertext, applies a corresponding decryption key, and recovers each block to produce plaintext output to the receiver.

The computing device on which the data transmission system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
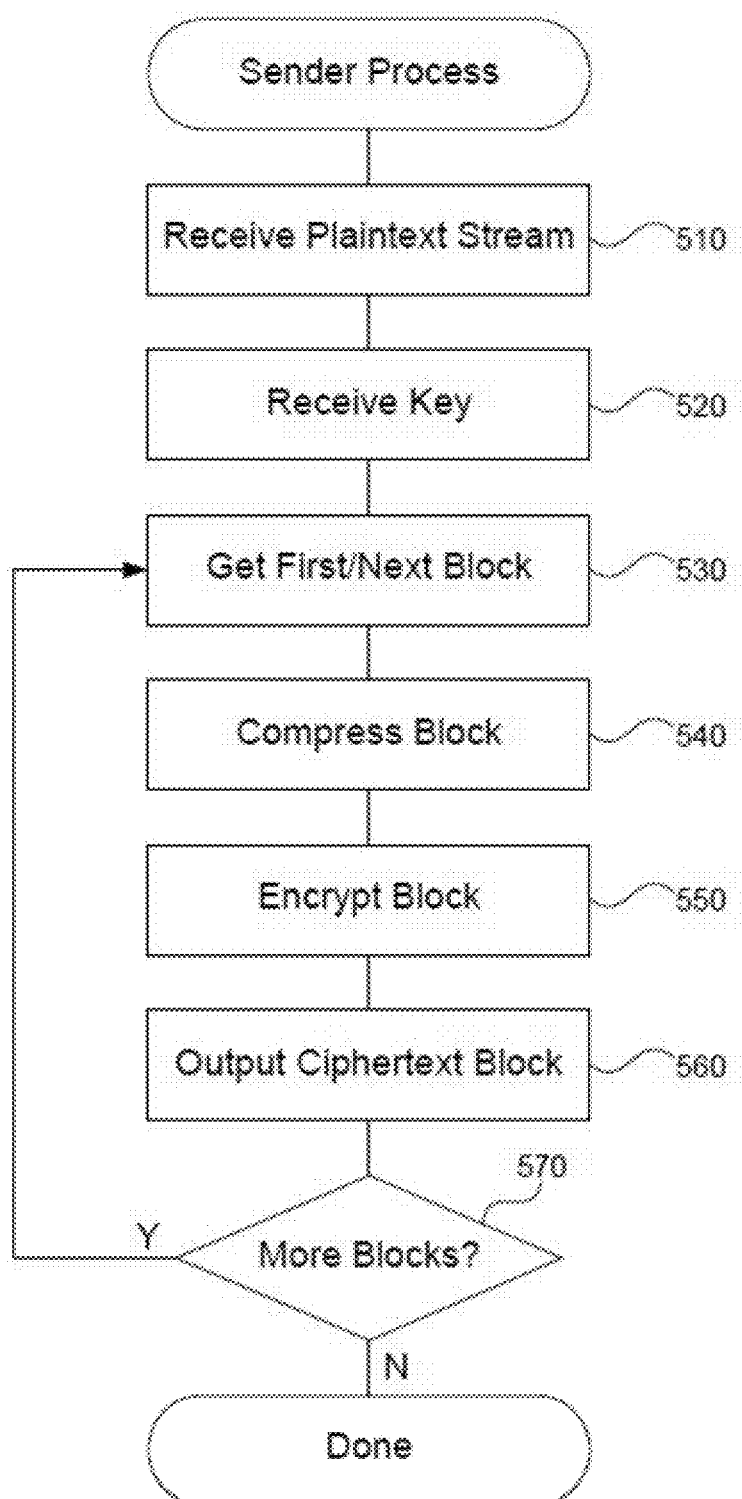
FIG. 5 is a flow diagram that illustrates the data transmission process of an incoming plaintext stream to produce compressed and encrypted ciphertext as output, in one embodiment.

FIG. 5 is a flow diagram that illustrates processing of the data transmission system to process an incoming plaintext stream to produce compressed and encrypted ciphertext as output, in one embodiment.

Beginning in block 510, the system receives a stream of incoming plaintext to compress and encrypt. The plaintext may include various types of data, such as text, image, audiovisual, binary, or other data. The system receives the plaintext input via a programmatic or other interface. For example, the system may be implemented as a software module and imported by other systems that want to leverage the functionality of the data transmission system. The incoming stream is dividable into subsets, called blocks, which are each processed as described herein. The incoming stream may be a continuous stream that constantly provides blocks of data over a period during which transmission occurs.

Continuing in block 520, the system receives one or more cryptographic keys for encrypting the received stream of incoming plaintext. The keys may include one or more symmetric or asymmetric keys, a public or private key, or other keys. The system receives the keys via a programmatic or other interface. The system can operate with many types of encryption algorithms, and the type of key received is one that is suited for operation with the particular encryption scheme used by a particular implementation of the system. Depending on the encryption scheme, the system may use a single key for encoding all received plaintext, or may receive multiple keys used at various times or for particular types of data.

Continuing in block 530, the system gets the next block of received plaintext data to be processed. The system may divide the incoming plaintext stream into blocks based on a particular fixed size or other criteria (e.g., the data received during a particular period). The system may leverage output data from previous iterations so that the next block is affected by the previous block. Alternatively or additionally, the system may process each block independently to reduce dependencies between blocks. On the first round, the system selects the first incoming block, and on subsequent rounds, the system selects the next block in sequence in the incoming stream.

Continuing in block 540, the system compresses the incoming next block of received plaintext data. The compression may select from a variety of available well-known or proprietary compression algorithms or processes, such as the CMC process described herein. Compression reduces the size of data by encoding redundant or known data using a smaller identifier, or using other techniques for recognizing redundancy and inefficiency in data. Some data is more compressible than other data, and thus the size of the compressed data may vary based on a level of compression achieved. Compression may also be lossy or lossless, such that decompression at the receiving side may result in exact or approximate decompressed data. Compression of data may load data into certain registers or data structures that may be leveraged by the following encryption step to avoid having to redundantly setup data for processing.

Continuing in block 550, the system encrypts the compressed next block of received plaintext data. Encryption follows compression so that compression occurs before encryption has randomized the data, which would result in lower compression effectiveness. Like compression, the encryption may select from a variety of available well-known or proprietary encryption algorithms or processes, such as the DRM process described herein. Unlike prior systems, encryption occurs as soon as a single block is compressed, and may even occur in parallel while the block is being compressed. Encryption does not wait for the entire stream or a large subset of the stream to be compressed before encryption begins. Rather, encryption may happen on a particular block in close time proximity to the compression, so that encryption is able to leverage data structures and registers already loaded and setup for the compression process. This results in greater efficiency for the overall operation of the system.

Continuing in block 560, the system outputs a ciphertext block comprised of the compressed and encrypted next block of received plaintext data. The system may output the ciphertext block via a programmatic or other interface, where the output block may be further processed or prepared for transmission to a receiving endpoint. The output ciphertext block may be both smaller and more private (protected from snooping and tampering) than the input plaintext block. Compression and encryption of the plaintext block occurs in an efficient, single-pass manner to produce the ciphertext block.

Continuing in decision block 570, if there are more blocks in the plaintext stream, then the system loops to block 530 to process the next block of received plaintext data. The system continues processing blocks of data in this manner until all of the blocks in the stream have been processed. The receiving endpoint performs a similar but reversed version of this process, described further below with reference to FIG. 7. In addition, communication normally occurs both ways, meaning that the sending endpoint and the receiving endpoint may each perform the sending process described with reference to FIG. 5 and the receiving process described with reference to FIG. 7. After block 570, these steps conclude.

Using the example of CMCDRM, the CMCDRM compression-encryption process is illustrated in pseudo code below:

```
CMCDRM( plaintext, key64)
    plaintext : original source stream
    ciphertext : compressed-encrypted stream
    key128 : 128-bit nonce
    set : index to ECB1 and ECB2
    k1 = low 64-bit of key128
    k2 = high 64-bit of key128
    Init_ECB1( k1, k2)
    Init_ECB2( )
    set = 0
    For each block from plaintext
        cmprblk : compressed block
        buffer : internal buffer
        cmprblk = CMC( block, set)
        append cmprblk and control tokens to buffer
        if buffer output available (flush?)
```

```
          For each block from buffer
              encrblk : compressed-encrypted block
              encrblk = Ecb1[set] + Ecb2[set]
                      + Hash( k1, k2) − block
              append encrblk to ciphertext
              Shuffle_Keys( k1, k2)
          End For
      End if
      Update_Set( block, set)
  End For
End CMCDRM
```

First, initialization takes place: The initial 128-bit nonce initializes the two internal 64-bit keys, k1 and k2. They hold the initial values for the LFSRs that preset the static ECB1, via the Init_ECB1( ) routine, as well as the LFSRs that generate the pseudorandom keystream, via the Shuffle_Keys ( ) routine. After the set contents, ECB1, and ECB2 are initialized, each symbol from the plaintext is processed. CMC compression is performed for each symbol, eventually producing some compressed output. Each byte produced is then encrypted using the equation:

Ciphertext block = Ecb1[set] + Ecb2[set] + Hash( k1, k2) − compressed Plaintext block Finally, right before the current iteration ends, the set contents are updated to prepare for the next compression-encryption round. The encryption performed by the CMCDRM compressor-cipher not only depends on the keystream but also on the internal CMC compression state. Hence, since CMCDRM is also a stream compressor-cipher, it is possible to perform high-speed compression and encryption within the same loop iteration for each plaintext symbol. This has tremendous potential for applications that not only would benefit from effective, high-speed compression but also from strong encryption of their application data.

The following paragraphs illustrate processing of the data transmission system to encrypt a block of data, in one embodiment. The compression and encryption stages of CMCDRM can be carried out in parallel. The encryption process is described next, and begins with static Electronic Codebook 1 (ECB1) initialization. The ECB1 is first initialized with a 128-bit nonce. Initialization of the ECB1 is performed prior to processing plaintext symbols, according to the following process:

```
Init_ECB1( k1, k2)
    k1 : high 64-bit word of 128-bit nonce
    k2 : low 64-bit word of 128-bit nonce
    Ecb1 : start address of ECB1
    Loop i = 0 to 255
        k1 = LFSR( k1, tap = 0x99986667CC4C4ECE)
        Ecb1[i] = Hash( k1, k2)
        k2 = LFSR( k2, tap = 0x88F708DDD4D4CACA)
    End Loop
End Init_ECB1
``` where LFSR(key, tap) is the algorithm used to implement a Galois LFSR that receives the current key state and the tap bits as input, respectively, and returns the next key state as output:

```
LFSR( key, tap)
    key : current state
    tap : tap bits
    output : next state
    if key.b0 is 0
        LFSR = key / 2
    else
        LFSR = (key AND tap) / 2
End LFSR
``` and Hash(k1, k2) is a simple hashing algorithm that combines keys k1 and k2 from 128 bits to 8 bits:

```
Hash( k1, k2)
    k1 : high 64-bit word of 128-bit nonce
    k2 : low 64-bit word of 128-bit nonce
    Hash = (k1 >> (k2 AND 31)) − (k2 >> (k1 AND 31))
End Hash
``` where AND is the "bitwise and" operator and ">>" is the "bitwise shift-right" operator.

The system then proceeds to dynamic Electronic Codebook 2 (ECB2) initialization. Initialization of the ECB2 is performed prior to processing plaintext symbols. Although the ECB2 contents can be initialized to any value, they are initialized to null here for simplicity. This works well for most binary files since 0x00 is a common placeholder and padding value. For text files, however, the ASCII code for space, 0x20, yields better compression. The following algorithm initializes ECB2:

```
Init_ECB2( )
    Ecb2 : start address of ECB2
    Loop i = 0 to 2^K − 1
        Ecb2[i] = 0
    End Loop
End Init_ECB2
```

Since CMCDRM is a stream compressor-cipher, a new 128-bit key is self-generated and hashed down to 8 bits with every compressed plaintext symbol output by the CMC compressor. The 8-bit hashed key is then used in the final summation to compute the ciphertext data. The following key scheduling algorithm uses the LFSR module described above to generate the next 128-bit key from the keystream:

```
Shuffle_Keys( ref k1, ref k2)
    k1 : 64-bit first key from keystream
    k2 : 64-bit second key from keysream
    k1 = LFSR( k1, tap =0xD4D4CACACC4C4ECE)
    k2 = LFSR( k2, tap =0x88F708DD99986667)
End Shuffle_Keys
```

The system then proceeds to propagating plaintext block chaining (PPBC). As mentioned earlier, the ECB2 block in the CMCDRM diagram is used for two purposes: as a cache memory, the workspace used by the CMC codec during compression, and as an electronic codebook (ECB), a dynamic lookup table used during encryption. However, unlike other ECBs, the input to ECB2 is not the current plaintext symbol received from the source stream, but instead, a function of the "previous" plaintext symbols shifted by 5 bits, XOR'ed, and masked down to K bits, the address space of ECB2. For easier construction of the propagating plaintext function, a variable named "set" is used as input to the ECB2 block, as depicted in FIG. 1. The process of constructing the set contents is illustrated below, after processing a few plaintext symbols:

```
2107654321076543210176543210 (bit positions inside plaintext symbols)
----------------------------
2222222211111111         (bit count - 10s)
6543210987654321098765432l0  (bit count - 1s)
----------------------------
       -->...... 15 ..... <-- (ECB2 addressing space)
              |    --> 3 <-- (overlapping bits)
              |       76543210
              |       XOR
              | 76543210
              | XOR
        76543210 <-- bits 0-20 (21 bits used from plaintext)
        XOR
    76543210
    XOR
  76543210
```

From the above it is clear that for K=15, the three previous plaintext symbols are involved in the calculation of the set contents. This creates a very fast and peculiar form of hashing that not only improves CMC compression, but also strengthens encryption by increasing the dependence on the compression stage. As a side note, the shift-XOR operation that hashes the previous symbols can be considered a variant of the propagating plaintext block chaining mode (PPBC), as the Update_Set( ) algorithm shows:

```
Update_Set( symbol, ref set)
    set : past hashed symbols (input to ECB1 and ECB2)
    set = ((set << 5) XOR symbol) AND (2^K – 1)
End Update_Set
```

Note that the set is updated at the end of the current iteration, after the current plaintext has been compressed and encrypted. Hence, the symbol specified in the Update_Set( ) routine will refer to the previous symbol during the next iteration of CMCDRM.

The following paragraphs describe the CMC compression logic. The CMC compression logic is best understood in the context of the compression process. As its name implies, the CMC logic is a functional box that uses combinatorial logic to compress plaintext symbols. It interacts directly with the cache workspace, also used as an ECB during encryption.

Figure 6:
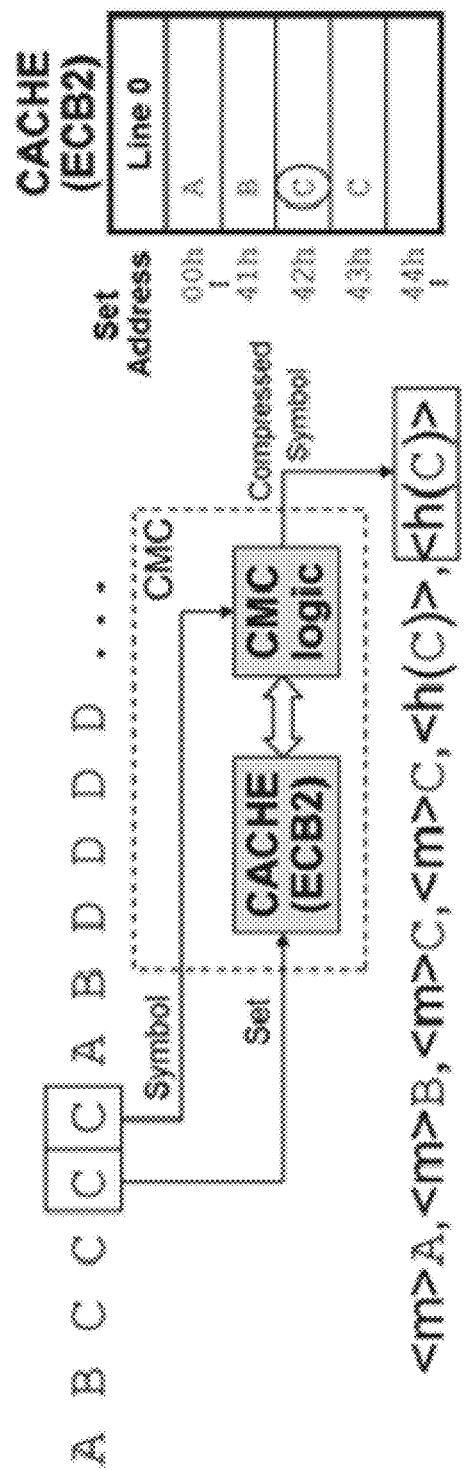
FIG. 6 is a block diagram that illustrates the role of the cache and the CMC logic in the compression process, in one embodiment.

FIG. 6 is a block diagram that illustrates the role of the CMC logic in the compression process, in one embodiment. Since CMC is a lossless, stream compressor, the functional separation between a plaintext symbol and a compressed symbol is therefore possible. This allows implementing the CMC logic as a stateless, combinatorial box that receives a single symbol as input, obtained from the current iteration, and sends a single compressed symbol as output. In contrast, such discretization at the symbol level is not possible or apparent for block compressors. The CMC logic, which executes in parallel with the encryption stage, is expressed in the routine below. Each compressed symbol output can be either a hit code, or a miss code followed by the original symbol.

```
CMC( symbol, set)
    symbol : current symbol from plaintext
    set : past hashed symbols (input to cache)
    output : compressed symbol
    if symbol is in cache (ECB1)
        output = encode hit
    else
        output = encode miss followed by symbol
    CMC = output
End CMC
```

Figure 7:
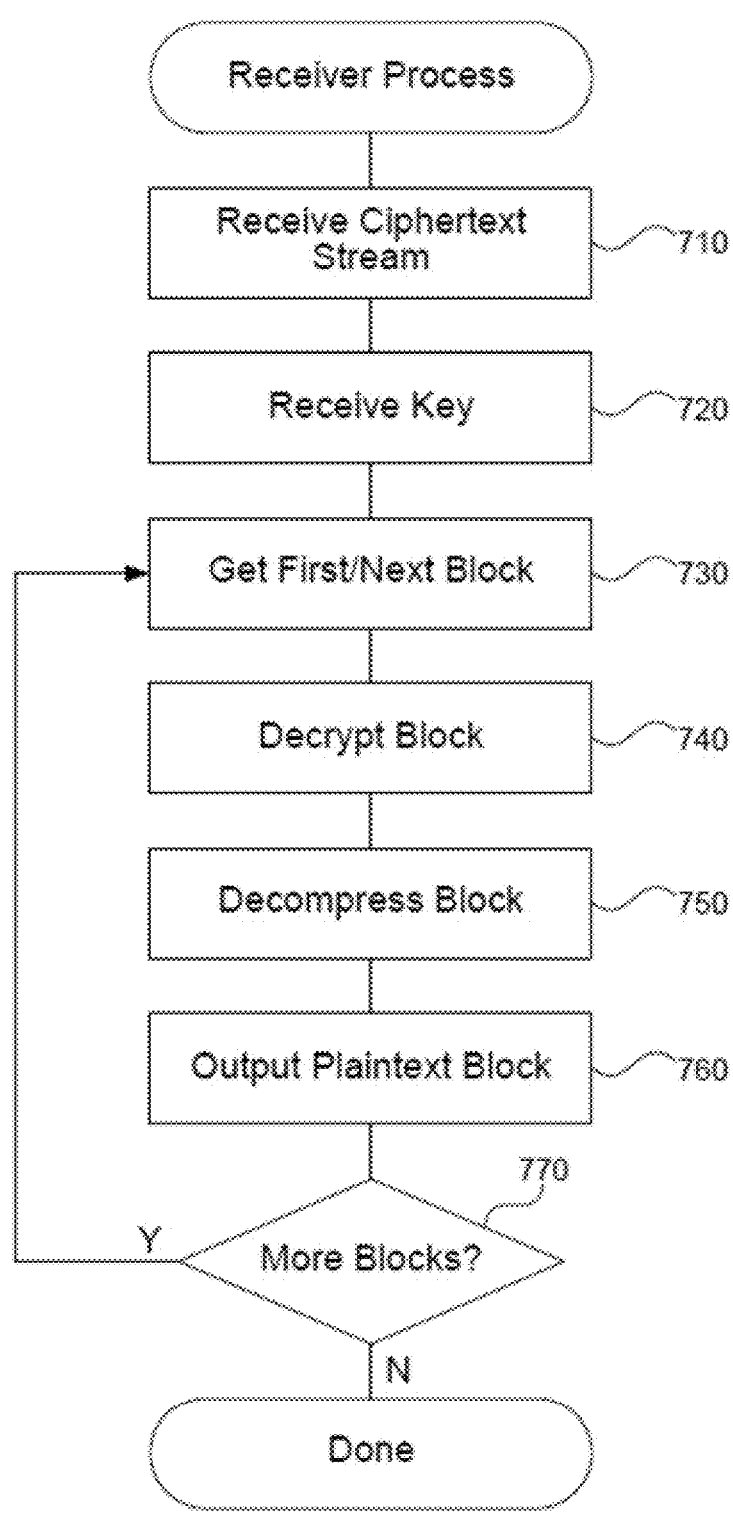
FIG. 7 is a flow diagram that illustrates processing of the data reception system to process an incoming ciphertext stream to produce decompressed output and decrypted plaintext, in one embodiment.

FIG. 7 is a flow diagram that illustrates processing of the data reception system to process an incoming ciphertext stream to produce decompressed and decrypted plaintext as output, in one embodiment.

Beginning in block 710, the system receives a stream of incoming ciphertext to decrypt and decompress. The ciphertext stream is one produced in accordance with the sending process described with reference to FIG. 5. The original plaintext may include various types of data, such as text, image, audiovisual, binary, or other data that is represented in compressed and encrypted form by the ciphertext. The system receives the ciphertext input via a programmatic or other interface. For example, the system may be implemented as a software module and imported by other systems that want to leverage the functionality of the data reception system. The incoming stream is dividable into subsets, called blocks, which are each processed as described herein. The incoming stream may be a continuous stream that constantly provides blocks of data over a period of time during which receiving occurs.

Continuing in block 720, the system receives one or more cryptographic keys for decrypting the received stream of incoming ciphertext. The keys may include one or more symmetric or asymmetric keys, a public or private key, or other keys. For example, the system may receive a public key associated with a private key previously used to encrypt the incoming ciphertext stream. The system receives the keys via a programmatic or other interface. The system can operate with many types of encryption algorithms, and the type of key received is one that is suited for operation with the particular decryption scheme used by a particular implementation of the system. Depending on the decryption scheme, the system may use a single key for encoding all received ciphertext, or may receive multiple keys used at various times or for particular types of data.

Continuing in block 730, the system gets the next block of received ciphertext data to be processed. The system may divide the incoming ciphertext stream into blocks based on a particular fixed size or other criteria (e.g., the data received during a particular period). The system may leverage output data from previous iterations so that the next block is affected by the previous block. Alternatively or additionally, the system may process each block independently to reduce dependencies between blocks. On the first round, the system selects the first incoming block, and on subsequent rounds, the system selects the next block in sequence in the incoming stream.

Continuing in block 740, the system decrypts the incoming next block of received ciphertext data. Because encryption follows compression on the sending side, the process is reversed so that decryption precedes decompression on the receiving side. Decryption matches the encryption algorithm or process used by the sending side to recover decrypted, compressed data from the ciphertext stream. Decryption occurs block by block and decompression and decryption of a block can share and reuse resources (ECB2 and set value) to reduce overhead and processing time while also strengthening encryption. Decryption and decompression may even occur in parallel for further efficiency. Decryption may load data into certain registers or data structures that may be leveraged by the following decompression step to avoid having to redundantly setup data for processing.

Continuing in block 750, the system decompresses the decrypted next block of received ciphertext data. Decompression matches the compression scheme used by the sending side to recover decompressed plaintext data from the decrypted blocks. Depending on whether compression was lossy or lossless, decompression recovers an exact or approximate version of the originally encoded plaintext data to produce an output plaintext data stream. Like the sending side, the receiving side decrypts and decompresses data in a single pass over the compressed ciphertext stream within the same functional unit to increase efficiency.

Continuing in block 760, the system outputs a plaintext block comprised of the decrypted and decompressed next block of received ciphertext data. The system may output the plaintext block via a programmatic or other interface, where the output block may be further processed or prepared for use by an application.

Continuing in decision block 770, if there are more blocks in the ciphertext stream, then the system loops to block 730 to process the next block of received ciphertext data. The system continues processing blocks of data in this manner until all of the blocks in the compressed ciphertext stream have been processed. After block 770, these steps conclude.

In some embodiments, the data transmission system adds other cipher modes to the encryption stage. For instance, cipher block chaining can make the current ciphertext symbol dependent on all previous plaintext symbols processed. This makes encryption incremental. On the downside, more cipher modes could reduce speed.

In some embodiments, the data transmission system extends blended compression-encryption to other compressor-ciphers. The fact that CMC is both symmetric and stream oriented, makes it easier to blend a stream cipher onto it to process plaintext symbols within the same loop iteration. This can be done systematically for both symmetric and asymmetric codecs without removing the dependence on the compression stage to improve performance.

In some embodiments, the data transmission system leverages further speed optimizations by implementing a synthesized, field programmable gate array (FPGA) hardware based version of CMCDRM. For instance, since ECB2 serves both workspace and lookup table purposes, certain parallel optimizations are possible in hardware. Timing diagrams allow further optimizations to occur.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, and the like.

Illustrative Operating Environment

Figure 9:
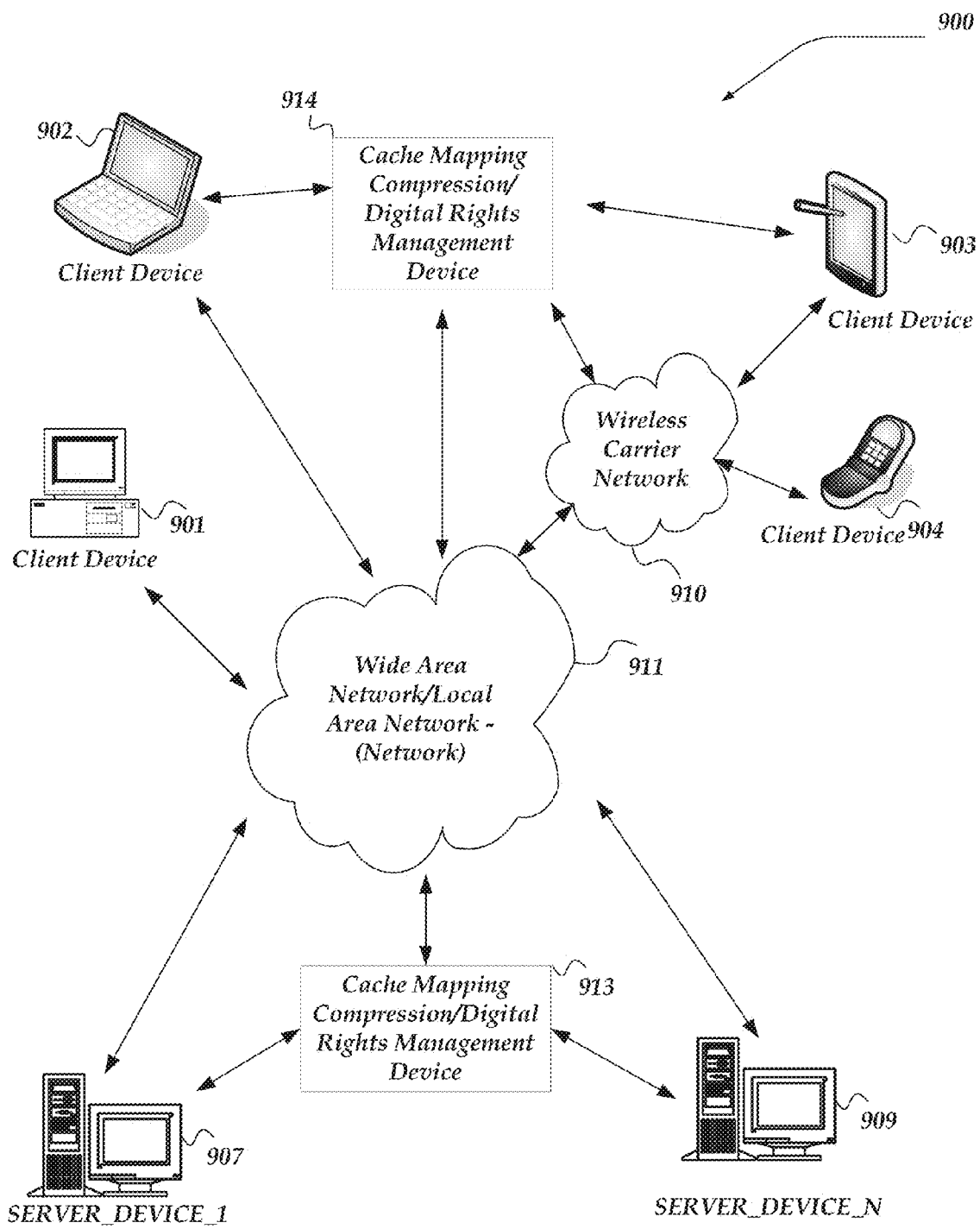
FIG. 9 is a system diagram of one embodiment of an environment in which the invention may be practiced.

FIG. 9 shows components of one embodiment of an environment in which the invention may be practiced. Not all the components may be required to practice various embodiments, and variations in the arrangement and type of the components may be made. As shown, system 900 of FIG. 9 includes local area networks ("LANs")/wide area networks ("WANs")–(network) 911, wireless network 910, client devices 901-904, server devices 1-N 907-909, and CMCDRM device 113.

Generally, client devices 902-904 may include virtually any portable computing device capable of receiving and sending a message over a network, such as network 911, wireless network 910, or the like. Client devices 902-904 may also be described generally as client devices that are configured to be portable. Thus, client devices 902-904 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 902-904 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 901 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 902-904 may operate over wired and/or wireless network. Today, many of these devices include a capability to access and/or otherwise communicate over a network such as network 911 and/or even wireless network 910. Moreover, client devices 902-904 may access various computing applications, including a browser, or other web-based application.

In one embodiment, one or more of client devices 901-904 may be configured to operate within a business or other entity to perform a variety of services for the business or other entity. For example, client devices 901-904 may be configured to operate as a web server, an accounting server, a production server, an inventory server, or the like. However, client devices 901-904 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 901-904 also may include at least one other client application that is configured to receive and/or send data, including budgeting and forecasting information, between another computing device. The client application may include a capability to provide requests and/or receive data relating to managing, operating, or configuring CMCDRM devices 913-914. In some embodiments, the client application may employ processes such as described above in conjunction with FIGS. 1-8 to perform at least some of its actions.

Wireless network 910 is configured to couple client devices 902-904 and its components, including CMCDRM 914, with network 911. Wireless network 910 may include any of a variety of wireless sub-networks that may further overlay stand-alone ad-hoc networks, or the like, to provide an infrastructure-oriented connection for client devices 902-904. Such sub-networks may include mesh networks, Wireless LAN (WLAN) networks, cellular networks, or the like.

Wireless network 910 may further include an autonomous system of terminals, gateways, routers, or the like connected by wireless radio links, or the like. These connectors may be configured to move freely and randomly and organize themselves arbitrarily, such that the topology of wireless network 910 may change rapidly.

Wireless network 910 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 902-904 with various degrees of mobility. For example, wireless network 910 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 910 may include virtually any wireless communication mechanism by which information may travel between client devices 902-904 and another computing device, network, or the like.

Network 911 is configured to couple network devices with other computing devices, including, servers 907-909, CMCDRM devices 913-914, client device(s) 901, and through wireless network 910 to client devices 902-904. Network 911 is enabled to employ any form of computer readable media for communicating information from one electronic device to another. Also, network 911 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 911 and wireless network 910. Furthermore, remote computers and other related electronic devices could be remotely connected to either LANs or WANs via a modem and temporary telephone link. In essence, network 911 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 12:
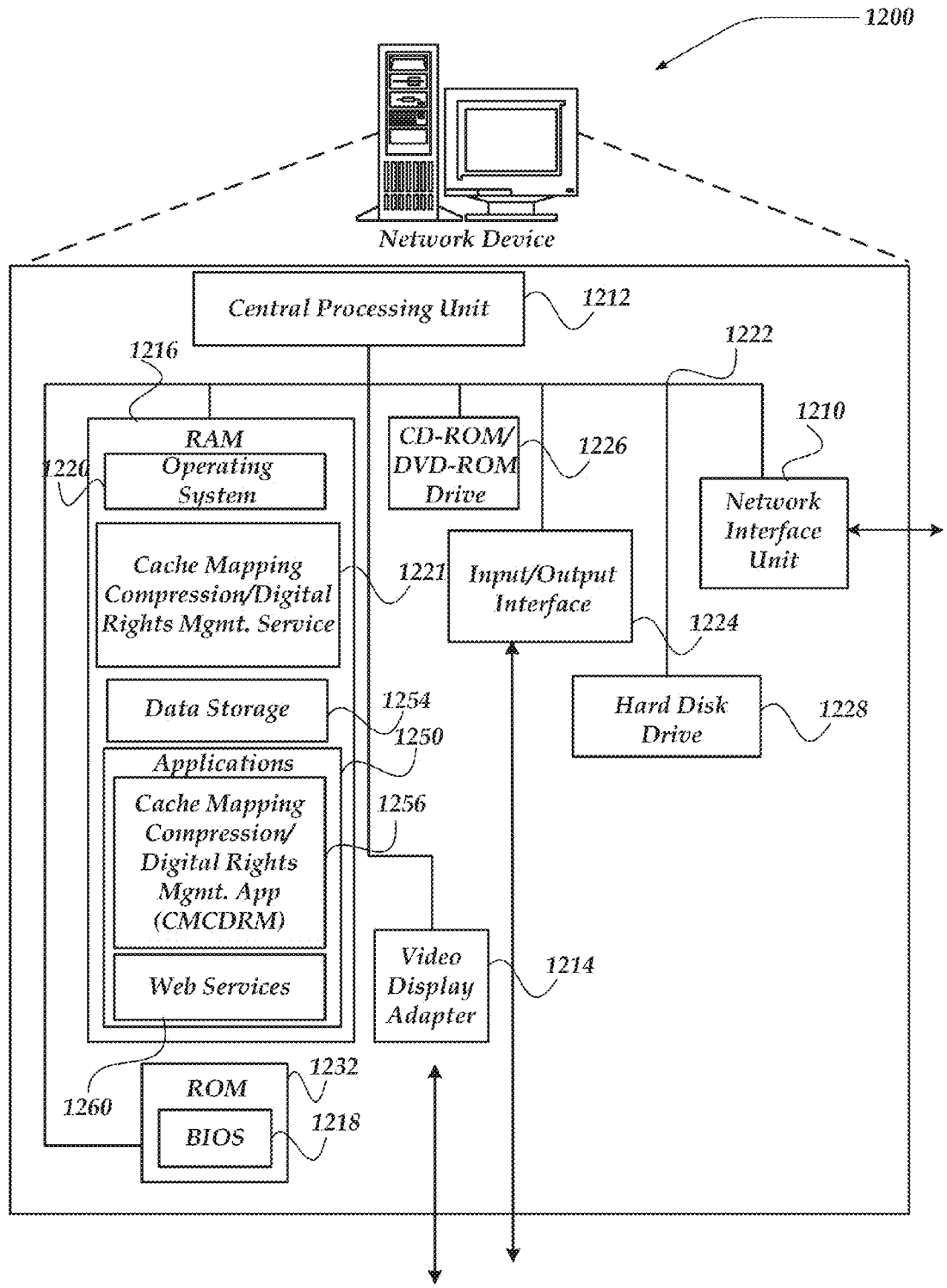
FIG. 12 shows one embodiment of a mobile device that may be included in a system implementing the invention.

CMCDRM devices 913-914 may include virtually any network devices usable to provide cryptographic services, such as network device 1200 of FIG. 12. In one embodiment, CMCDRM device 913 employs various techniques to encrypt and/or decrypt data and messaging information, including providing encryption/decryption services for servers 907-909. In one embodiment, CMCDRM device 914 employs various techniques to encrypt and/or decrypt data and messaging information, including providing encryption/decryption services for client devices 902-904.

Devices that may operate as CMCDRM devices 913-914 include various network devices, including, but not limited to personal computers, desktop computers, multiprocessor systems, microprocessor-based or programmable consumer electronics, network PCs, server devices, network appliances, or the like. It should be noted that while CMCDRM devices 913-914 are illustrated as a single network devices, the invention is not so limited. Thus, in another embodiment, CMCDRM devices 913-914 may represent a plurality of network devices. For example, in one embodiment, CMCDRM device 913 may be distributed over a plurality of network devices and/or implemented using cloud architecture. Also, in at least one of the various embodiments, CRMDRM services may be provided in software and/or hardware modules that may be part of a larger system and/or device (e.g., operating system modules, client browser plug-ins, daughter boards, separate chipsets, or the like).

Moreover, CMCDRM devices 913-914 are not limited to a particular configuration. Thus, CMCDRM devices 913-914 may operate using a master/slave approach over a plurality of network devices, within a cluster, a peer-to-peer architecture, and/or any of a variety of other architectures. Thus, CMCDRM devices 913-914 are not to be construed as being limited to a single environment, and other configurations, and architectures are also envisaged. CMCDRM devices 913-914 may employ processes such as described above in conjunction with FIGS. 1-8 to perform at least some of its actions.

Illustrative Client Device

Figure 10:
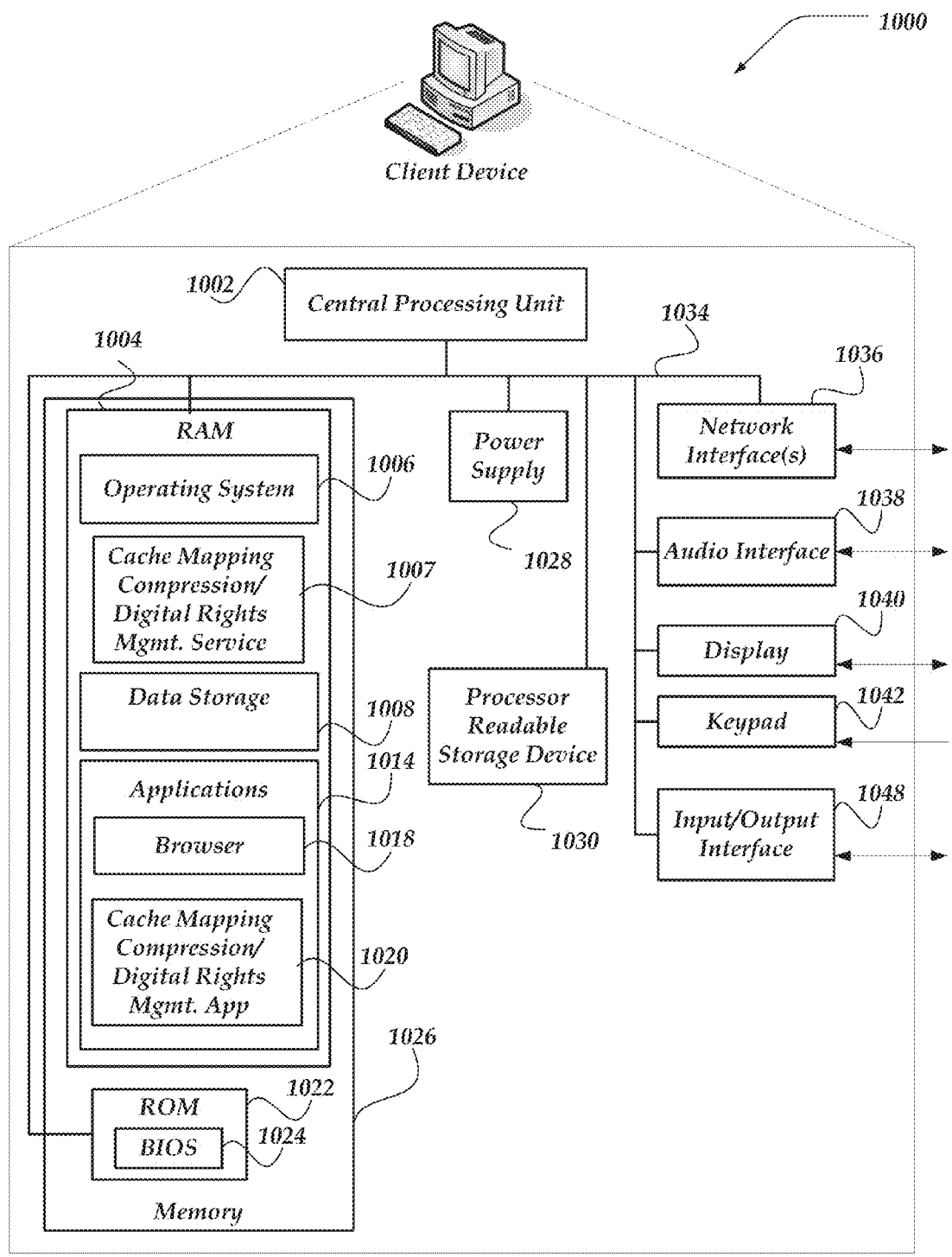
FIG. 10 shows one embodiment of a client device that may be included in a system implementing the invention.

FIG. 10 shows one embodiment of client device 200 that may be included in a system implementing embodiments of the invention. Client device 1000 may include many more or less components than those shown in FIG. 10. However, the components shown are sufficient to disclose an illustrative embodiment for practicing the present invention. Client device 1000 may represent, for example, one embodiment of at least one of client devices 901-904 of FIG. 9.

As shown in the figure, client device 1000 includes a central processing unit ("CPU") 1002 in communication with a mass memory 1026 via a bus 1034. Client device

1000 also includes a power supply 1028, one or more network interfaces 1036, an audio interface 1038, a display 1040, a keypad 1042, and an input/output interface 1048. Power supply 1028 provides power to client device 1000. A rechargeable or non-rechargeable battery may be used to provide power. The power may also be provided by an external power source, such as an AC adapter or a powered docking cradle that supplements and/or recharges a battery.

Client device 1000 may optionally communicate with a base station (not shown), or directly with another computing device. Network interface 1036 includes circuitry for coupling client device 1000 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 1036 is sometimes known as a transceiver, transceiving device, or network interface card ("NIC").

Audio interface 1038 is arranged to produce and receive audio signals such as the sound of a human voice. For example, audio interface 1038 may be coupled to a speaker and microphone (not shown) to enable telecommunication with others and/or generate an audio acknowledgement for some action. Display 1040 may be a liquid crystal display ("LCD"), gas plasma, light emitting diode ("LED"), or any other type of display used with a computing device. Display 1040 may also include a touch sensitive screen arranged to receive input from an object such as a stylus or a digit from a human hand.

Keypad 1042 may comprise any input device arranged to receive input from a user. For example, keypad 1042 may include a push button numeric dial, or a keyboard. Keypad 1042 may also include command buttons that are associated with selecting and sending images.

Client device 1000 also comprises input/output interface 1048 for communicating with external devices, such as a headset, or other input or output devices not shown in FIG. 10. Input/output interface 1048 can utilize one or more communication technologies, such as USB, infrared, Bluetooth™, or the like.

Mass memory 1026 includes a Random Access Memory ("RAM") 1004, a Read-only Memory ("ROM") 1022, and other storage means. Mass memory 1026 illustrates an example of computer readable storage media (devices) for storage of information such as computer readable instructions, data structures, program modules or other data. Mass memory 1026 stores a basic input/output system ("BIOS") 1024 for controlling low-level operation of client device 1000. The mass memory also stores an operating system 1006 for controlling the operation of client device 1000. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 1026 further includes one or more data storage 1008, which can be utilized by client device 1000 to store, among other things, applications 1014 and/or other data. For example, data storage 1008 may also be employed to store information that describes various capabilities of client device 1000. The information may then be provided to another device based on any of a variety of events, including being sent as part of a header during a communication, sent upon request, or the like. At least a portion of the information may also be stored on a disk drive or other computer-readable storage device (not shown) within client device 1000.

Applications 1014 may include computer executable instructions which, when executed by client device 1000, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 1014 may include, for example, browser 1018 and CMCDRM client application 1020.

Browser 1018 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 1018 may enable a user of client device 1000 to communicate with another network device. In one embodiment, browser 1018 may enable a user to view and/or manipulate CMCDRM device configuration features, status reports, administrative functions, or the like.

In at least one of the various embodiments, a user may employ client device 1000 to interact and access information stored or otherwise managed using CMCDRM devices 913-914. In at least one of the various embodiments, CMCDRM client application 1020 may be arranged to enable a user to view and/or manipulate CMCDRM device configuration features, status reports, administrative functions, or the like, as further discussed below. Further, CMCDRM client application 1020 may be employed to provide cryptographic operations such as, encryption, decryption, compression, decompression, or the like. Likewise, in at least one of the various embodiments, CMCDRM service 1007 may be an operating system level component and/or module that may be employed to provide cryptographic operations such as, encryption, decryption, compression, decompression, or the like. In at least one of the various embodiments, client device 1000 may be arranged to include both CMCDRM service 1007 and CMCDRM client application 1020. Likewise, in some embodiments, a CMCDRM service may be present and in still other embodiments, a CMCDRM client application may be present. Thus, either CMCDRM client application or the CMCDRM service may be employed separate of each other.

In any event, CMCDRM client application 1020 may employ processes similar to those described above in conjunction with FIGS. 1-8 to perform at least some of its actions.

Mobile Device

Figure 11:
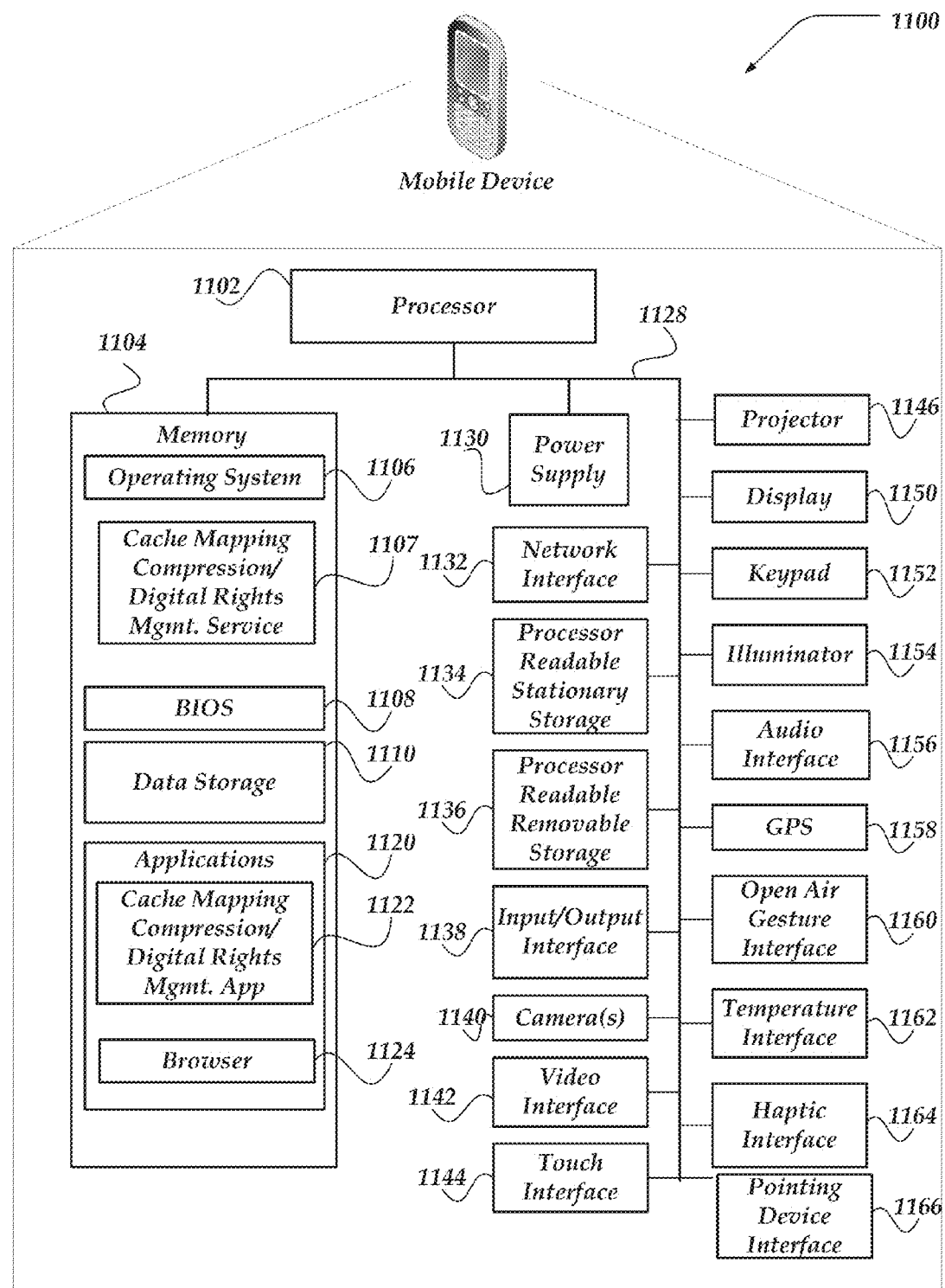
FIG. 11 shows one embodiment of a network device that may be included in a system implementing the invention.

FIG. 11 shows one embodiment of mobile device 1100 that may include many more or less components than those shown. Mobile device 1100 may represent, for example, at least one embodiment of mobile devices shown in FIG. 9.

Mobile device 1100 includes processor 1102 in communication with memory 1104 via bus 1128. Mobile device 1100 also includes power supply 1130, network interface 1132, audio interface 1156, display 1150, keypad 1152, illuminator 1154, video interface 1142, input/output interface 1138, haptic interface 1164, global positioning systems (GPS) receiver 1158, open air gesture interface 1160, temperature interface 1162, camera(s) 1140, projector 1146, pointing device interface 1166, processor-readable stationary storage device 1134, and processor-readable removable storage device 1136. Power supply 1130 provides power to mobile device 1100. A rechargeable or non-rechargeable battery may be used to provide power. The power may also be provided by an external power source, such as an AC adapter or a powered docking cradle that supplements and/or recharges the battery. And in one embodiment, although not shown, a gyroscope and/or accelerometer may be employed within mobile device 1100 to measuring and/or maintaining an orientation of mobile device 1100.

Mobile device 1100 may optionally communicate with a base station (not shown), or directly with another computing device. Network interface 1132 includes circuitry for coupling mobile device 1100 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wireless communication protocols. Network interface 1132 is sometimes known as a transceiver, transceiving device, or network interface card (NIC).

Audio interface 1156 is arranged to produce and receive audio signals such as the sound of a human voice. For example, audio interface 1156 may be coupled to a speaker and microphone (not shown) to enable telecommunication with others and/or generate an audio acknowledgement for some action. A microphone in audio interface 1156 can also be used for input to or control of mobile device 1100, e.g., using voice recognition, detecting touch based on sound, and the like.

Display 1150 may be a liquid crystal display (LCD), gas plasma, electronic ink, light emitting diode (LED), Organic LED (OLED) or any other type of light reflective or light transmissive display that can be used with a computing device. Display 1150 may also include a touch interface 1144 arranged to receive input from an object such as a stylus or a digit from a human hand, and may use resistive, capacitive, surface acoustic wave (SAW), infrared, radar, or other technologies to sense touch and/or gestures. Projector 1146 may be a remote handheld projector or an integrated projector that is capable of projecting an image on a remote wall or any other reflective object such as a remote screen.

Video interface 1142 may be arranged to capture video images, such as a still photo, a video segment, an infrared video, or the like. For example, video interface 1142 may be coupled to a digital video camera, a web-camera, or the like.

Video interface 1142 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1152 may comprise any input device arranged to receive input from a user. For example, keypad 1152 may include a push button numeric dial, or a keyboard. Keypad 1152 may also include command buttons that are associated with selecting and sending images. Illuminator 1154 may provide a status indication and/or provide light. Illuminator 1154 may remain active for specific periods of time or in response to events. For example, when illuminator 1154 is active, it may backlight the buttons on keypad 1152 and stay on while the mobile device is powered. Also, illuminator 1154 may backlight these buttons in various patterns when particular actions are performed, such as dialing another mobile device. Illuminator 1154 may also cause light sources positioned within a transparent or translucent case of the mobile device to illuminate in response to actions.

Mobile device 1100 may also comprises input/output interface 1138 for communicating with external peripheral devices or other computing devices such as other mobile devices and network devices. The peripheral devices may include an audio headset, display screen glasses, remote speaker system, remote speaker and microphone system, and the like. Input/output interface 1138 can utilize one or more technologies, such as Universal Serial Bus (USB), Infrared, WiFi, WiMax, Bluetooth™, and the like. Haptic interface 1164 is arranged to provide tactile feedback to a user of the mobile device. For example, the haptic interface 1164 may be employed to vibrate mobile device 1100 in a particular way when another user of a computing device is calling. Temperature interface 1162 may be used to provide a temperature measurement input and/or a temperature changing output to a user of mobile device 1100. Open air gesture interface 1160 may sense physical gestures of a user of mobile device 1100, for example, by using single or stereo video cameras, radar, a gyroscopic sensor inside a device held or worn by the user, or the like. Camera 1140 may be used to track physical eye movements of a user of mobile device 1100.

GPS transceiver 1158 can determine the physical coordinates of mobile device 1100 on the surface of the Earth, which typically outputs a location as latitude and longitude values. GPS transceiver 1158 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 1100 on the surface of the Earth. It is understood that under different conditions, GPS transceiver 1158 can determine a physical location for mobile device 1100. In at least one embodiment, however, mobile device 1100 may, through other components, provide other information that may be employed to determine a physical location of the device, including for example, a Media Access Control (MAC) address, IP address, and the like.

Human interface components can be peripheral devices that are physically separate from mobile device 1100, allowing for remote input and/or output to mobile device 1100. For example, information routed as described here through human interface components such as display 1150 or keyboard 1152 can instead be routed through network interface 1132 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include browser application 1124 that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like.

Memory 1104 may include Random Access Memory (RAM), Read-Only Memory (ROM), and/or other types of memory. Memory 1104 illustrates an example of computer-readable storage media (devices) for storage of information such as computer-readable instructions, data structures, program modules or other data. Memory 304 stores a basic input/output system (BIOS) 1108 for controlling low-level operation of mobile device 1100. The memory also stores an operating system 1106 for controlling the operation of mobile device 1100. It will be appreciated that this component may include a general-purpose operating system such as a version of UNIX, or LINUX™, Microsoft Corporation's Windows™, Apple® OS, or a specialized mobile computer communication operating system such as Windows Mobile™, Apple® iOS, Android™, or the Symbian® operating system. The operating system may include, or interface with a Java virtual machine module that enables control of hardware components and/or operating system operations via Java application programs. In at least one of the various embodiments, CMCDRM service 1107 may be an operating system level component and/or module that may be employed to provide cryptographic operations such as, encryption, decryption, compression, decompression, or the like.

Memory 1104 further includes one or more data storage 1110, which can be utilized by mobile device 1100 to store, among other things, applications 1120 and/or other data. For example, data storage 1110 may also be employed to store information that describes various capabilities of mobile device 1100. The information may then be provided to another device based on any of a variety of events, including being sent as part of a header during a communication, sent upon request, or the like. Data storage 1110 may also be employed to store social networking information including address books, buddy lists, aliases, user profile information, or the like. Data storage 1110 may further include program code, data, algorithms, and the like, for use by a processor, such as processor 1102 to execute and perform actions. In one embodiment, at least some of data storage 1110 might also be stored on another component of mobile device 1100, including, but not limited to, non-transitory processor-readable removable storage device 1136, processor-readable stationary storage device 1134, or even external to the mobile device. Data storage 1110 may include, for example, order item data, retail department information, order item images, or the like.

Applications 1120 may include computer executable instructions which, when executed by mobile device 1100, transmit, receive, and/or otherwise process instructions and data. Applications 1120 may include, for example, CMCDRM application 1122 and Browser 1124. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. In at least one of the various embodiments, CMCDRM client application 1122 may be arranged to enable a user to view and/or manipulate CMCDRM device configuration features, status reports, administrative functions, or the like, as further discussed below. Further, CMCDRM client application 1122 may be employed to provide cryptographic operations such as, encryption, decryption, compression, decompression, or the like. Likewise, in at least one of the various embodiments, mobile device 1100 may be arranged to include both CMCDRM service 1107 and CMCDRM client application 1122. Also, in some embodiments, a CMCDRM service may be present and in still other embodiments, a CMCDRM client application may be present. Thus, either CMCDRM client application 1122 or CMCDRM service 1107 may be employed separate of each other.

Illustrative Network Device

FIG. 12 shows one embodiment of a network device 1200, according to one embodiment of the invention. Network device 1200 may include many more or less components than those shown. The components shown, however, are sufficient to disclose an illustrative embodiment for practicing the invention. Network device 1200 may represent, for example, CMCDRM device 913 and/or CMCDRM device 914 of FIG. 9.

Network device 1200 includes central processing unit 1212, video display adapter 1214, and a mass memory, all in communication with each other via bus 1222. The mass memory generally includes RAM 1216, ROM 1232, and one or more permanent mass storage devices, such as hard disk drive 1228, tape drive, optical drive, flash drive, and/or floppy disk drive. The mass memory stores operating system 1220 for controlling the operation of network device 1200. Any general-purpose operating system may be employed. Basic input/output system ("BIOS") 1218 is also provided for controlling the low-level operation of network device 1200. As illustrated in FIG. 1, network device 1200 also can communicate with the Internet, or some other communications network, via network interface unit 1210, which is constructed for use with various communication protocols including the TCP/IP protocol. Network interface unit 1210 is sometimes known as a transceiver, transceiving device, or network interface card (NIC). Network device 1200 also includes input/output interface 1224 for communicating with external devices, such as a headset, or other input or output devices not shown in FIG. 12. Input/output interface 1224 can utilize one or more communication technologies, such as USB, infrared, Bluetooth™, or the like.

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 1254 may include a database, text, spreadsheet, folder, file, or the like Data storage 1254 may further include program code, data, algorithms, or the like, for use by a processor, such as central processing unit (CPU) 1212 to execute and perform actions. In one embodiment, at least some of data and/or instructions stored in data stores 1254 might also be stored on another device of network device 1200, including, but not limited to cd-rom/dvd-rom 1226, hard disk drive 1228, or other computer-readable storage device resident on network device 1200 or accessible by network device 1200 over, for example, network interface unit 1210.

The mass memory also stores program code and data. One or more applications 1250 are loaded into mass memory and run on operating system 1220. In at least one of the various embodiments, CMCDRM service 1221 may be an operating system level component and/or module that may be employed to provide cryptographic operations such as, encryption, decryption, compression, decompression, or the like. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include CMCDRM application 1256, web services 1260, or the like.

Web services 1260 represent any of a variety of services that are configured to provide content, over a network to another computing device. Thus, web services 1260 include for example, a web server, a File Transfer Protocol (FTP) server, a database server, a content server, or the like. Web services 1260 may provide the content over the network using any of a variety of formats, including, but not limited to WAP, HDML, WML, SGML, HTML, XML, compact HTML (cHTML), extensible (xHTML), or the like.

In one embodiment, web services 1260 may provide an interface for accessing and manipulating data in a data store, such as data storage 1254, or the like. In another embodiment, web services 1260 may provide interfaces for interacting with CMCDRM application 1256 and/or CMCDRM service 1221 that may enable a user to access and/or otherwise manage CMCDRM services that may be provided through network device 1200.

In at least one of the various embodiments, CMCDRM application 1256, may be deployed as a process, plug-in, extension, kernel module, or the like. In at least one of the various embodiments, CMCDRM application 1256 may be arranged to enable a user to view and/or manipulate CMCDRM device configuration features, status reports, administrative functions, or the like, as further discussed below. Further, CMCDRM application 1256 may be employed to provide cryptographic operations such as, encryption, decryption, compression, decompression, or the like. Likewise, in at least one of the various embodiments, network device 1200 may be arranged to include both CMCDRM service 1221 and CMCDRM application 1256. Also, in some embodiments, a CMCDRM service may be present and in still other embodiments, a CMCDRM application may be present. Thus, either CMCDRM application 1256 or CMCDRM service 1221 may be employed separate of each other.

In any event, in at least one of the various embodiments, CMCDRM application 1256, may employ processes, or parts of processes, similar to those described in conjunction with FIGS. 1-8 to perform at least some actions.

From the foregoing, it will be appreciated that specific embodiments of the data transmission system have been described herein for purposes of illustration, but that various modifications may be made without deviating from the spirit and scope of the invention.

What is claimed as new and desired to be protected by Letters Patent of the United States is:

1. A method for communicating data over a network with a network computer that is operative to perform actions, comprising:
responsive to receiving plain text data, performing actions, including:
compressing at least one data block of the plain text data using at least one compression component that stores compressed plain text data in a cache memory, wherein a code book is dynamically generated based on at least a portion of the compressed plain text data stored in the cache memory during compression of the data block;
employing at least one cryptographic component to encrypt the at least one compressed data block based on at least the code book and another code book, wherein the other code book is generated based on contents of the cache memory which includes a shifted function of one or more previously compressed data blocks of the plain text data that were stored in the cache memory as a workspace during compression; and
generating at least one cipher text block based on the at least one encrypted data block, wherein the at least one cipher text block is communicated over the network to at least one other network computer.

2. The method of claim 1, further comprising performing the actions in a single pass through the data.

3. The method of claim 1, further comprising employing at least one received cryptographic key to generate a key stream, wherein the key stream is employed to generate the other code book.

4. The method of claim 1, further comprising receiving a data stream that continuously provides plain text data from which data blocks are generated, compressed and encrypted in parallel.

5. The method of claim 1, further comprising performing encryption on a compressed data block before all of the data blocks are compressed.

6. The method of claim 1, wherein the encrypting enables digital rights management of the data.

7. The method of claim 1, further comprising, responsive to receiving data that includes cipher text data, performing further actions in a single pass through the received data including:
employing the at least one cryptographic component to decrypt the at least one cipher block;
employing the at least one compression component to decompress the at least one decrypted cipher block; and generating at least one plain text block based on the at least one decompressed cipher data block.

8. A network computer for communicating data over a network that is operative to perform actions, comprising:
   a transceiver component for communicating over a network;
   a memory component for storing instructions and data; and
   a processor component that executes instructions that enable actions, including:
      responsive to receiving plain text data, performing actions, including:
         compressing at least one data block of the plain text data using at least one compression component that stores compressed plain text data in a cache memory, wherein a code book is dynamically generated based on at least a portion of the compressed plain text data stored in the cache memory during compression of the data block;
         employing at least one cryptographic component to encrypt the at least one compressed data block based on at least the code book and another code book, wherein the other code book is generated based on contents of the cache memory which includes a shifted function of one or more previously compressed data blocks of the plain text data that were stored in the cache memory as a workspace during compression; and
         generating at least one cipher text block based on the at least one encrypted data block, wherein the at least one cipher text block is communicated over the network to at least one other network computer.

9. The network computer of claim 8, further comprising performing the actions in a single pass through the data.

10. The network computer of claim 8, further comprising employing at least one received cryptographic key to generate a key stream, wherein the key stream is employed to generate the other code book.

11. The network computer of claim 8, further comprising receiving a data stream that continuously provides plain text data from which data blocks are generated, compressed and encrypted in parallel.

12. The network computer of claim 8, further comprising performing encryption on a compressed data block before all of the data blocks are compressed.

13. The network computer of claim 8, wherein the encrypting enables digital rights management of the data.

14. The network computer of claim 8, further comprising, responsive to receiving data that includes cipher text data, performing further actions in a single pass through the received data including:
   employing the at least one cryptographic component to decrypt the at least one cipher block;
   employing the at least one compression component to decompress the at least one decrypted cipher block; and
   generating at least one plain text block based on the at least one decompressed cipher data block.

15. A processor readable non-transitory storage media that includes executable instructions for communicating data over a network with a network computer, wherein a processor component that is operative to execute the instructions enables actions, comprising:
   responsive to receiving plain text data, performing actions, including:
      compressing at least one data block of the plain text data using at least one compression component that stores compressed plain text data in a cache memory, wherein a code book is dynamically generated based on at least a portion of the compressed plain text data stored in the cache memory during compression of the data block;
      employing at least one cryptographic component to encrypt the at least one compressed data block based on at least the code book and another code book, wherein the other code book is generated based on contents of the cache memory which includes a shifted function of one or more previously compressed data blocks of the plain text data that were stored in the cache memory as a workspace during compression; and
      generating at least one cipher text block based on the at least one encrypted data block, wherein the at least one cipher text block is communicated over the network to at least one other network computer; and
      communicating the at least one cipher text block over the network to at least one other network device.

16. The media of claim 15, further comprising performing the actions in a single pass through the data.

17. The media of claim 15, further comprising employing at least one received cryptographic key to generate a key stream, wherein the key stream is employed to generate the other code book.

18. The media of claim 15, further comprising receiving a data stream that continuously provides plain text data from which data blocks are generated, compressed and encrypted in parallel.

19. The media of claim 15, further comprising performing encryption on a compressed data block before all of the data blocks are compressed.

20. The media of claim 15, wherein the encrypting enables digital rights management of the data.

21. The media of claim 15, further comprising, responsive to receiving data that includes cipher text data, performing further actions in a single pass through the received data including:
   employing the at least one cryptographic component to decrypt the at least one cipher block;
   employing the at least one compression component to decompress the at least one decrypted cipher block; and
   generating at least one plain text block based on the at least one decompressed cipher data block.

22. A system for communicating data over a network that is operative to perform actions, comprising:
   a network computer, including:
      a transceiver component for communicating over a network;
      a memory component for storing instructions and data; and
      a processor component that executes instructions that enable actions, including:
         responsive to receiving plain text data, performing actions, including:
            compressing at least one data block of the plain text data using at least one compression component that stores compressed plain text data in a cache memory, wherein a code book is dynamically generated based on at least a portion of the compressed plain text data stored in the cache memory during compression of the data block;
            compressing at least one data block of the plain text data using at least one compression component that stores compressed plain text data in the cache memory, wherein a code book is dynamically generated based on at least a portion of the compressed plain text data stored in the cache memory during compression of the data block;

employing at least one cryptographic component to encrypt the at least one compressed data block based on at least the code book and another code book, wherein the other code book is generated based on contents of the cache memory which includes a shifted function of one or more previously compressed data blocks of the plain text data that were stored in the cache memory as a workspace during compression; and generating at least one cipher text block based on the at least one encrypted data block, wherein the at least one cipher text block is communicated over the network to at least one other network computer; and the other computer, including:

another transceiver component for communicating over the network;

another memory component for storing instructions and data; and another processor component that executes instructions that enable actions of decrypting and decompressing the at least one cipher text block communicated over the network by the network computer.

23. The system of claim 22, wherein the network computer and the other computer perform the actions in a single pass.

24. The system of claim 22, wherein the actions of the processor component further comprise employing at least one received cryptographic key to generate a key stream, wherein the key stream is employed to generate the other code book.

25. The system of claim 22, wherein the actions of the processor component further comprises receiving a data stream that continuously provides plain text data from which data blocks are generated, compressed and encrypted in parallel.

26. The system of claim 22, wherein the actions of the processor component further comprise performing encryption on a compressed data block before all of the data blocks are compressed.

27. The system of claim 22, wherein the encrypting enables digital rights management of the data.

28. The system of claim 22, wherein the actions of the other processor component further comprise responsive to receiving data that includes cipher text data, performing further actions in a single pass through the received data including:

employing the at least one cryptographic component to decrypt the at least one cipher block;

employing the at least one compression component to decompress the at least one decrypted cipher block; and generating at least one plain text block based on the at least one decompressed cipher data block.

* * * * *

UNITED STATES PATENT AND TRADEMARK OFFICE
CERTIFICATE OF CORRECTION

PATENT NO. : 9,503,434 B2
APPLICATION NO. : 14/537806
DATED : November 22, 2016
INVENTOR(S) : Paris et al.

It is certified that error appears in the above-identified patent and that said Letters Patent is hereby corrected as shown below:

In the Drawings

In Fig. 8, Sheet 8 of 12, delete "compressec" and insert -- compressed --, therefor.

In the Specification

In Column 1, Line 10, delete "2012," and insert -- 2012, now Pat. No. 8,886,926, --, therefor.

In Column 4, Line 12, delete "XOR'ed" and insert -- XORed --, therefor.

In Column 4, Line 21, delete "XOR'ed" and insert -- XORed --, therefor.

In Column 6, Line 28, delete "uniform datagram protocol (UDP)," and insert -- user datagram protocol (UDP), --, therefor.

In Column 10, Line 50, delete "keysream" and insert -- keystream --, therefor.

In Column 10, Line 64, delete "XOR'ed," and insert -- XORed, --, therefor.

In Column 11, Line 26, delete "mode (PPBC)," and insert -- (PPBC) mode, --, therefor.

In Column 14, Line 61, delete "messages (WAP)," and insert -- (WAP) messages, --, therefor.

In Column 15, Line 36, delete "Mobil" and insert -- Mobile --, therefor.

In Column 15, Line 37, delete "Data GSM Environment" and insert -- Data rate for GSM Evolution --, therefor.

In Column 16, Line 41, delete "CRMDRM" and insert -- CMCDRM --, therefor.

Signed and Sealed this
Eighth Day of May, 2018

Andrei Iancu
*Director of the United States Patent and Trademark Office*

CERTIFICATE OF CORRECTION (continued)
U.S. Pat. No. 9,503,434 B2

In Column 19, Line 9, delete "receiver" and insert -- transceiver --, therefor.

In Column 19, Line 30, delete "for mobile" and insert -- for global system for mobile communication --, therefor.

In Column 21, Line 19, delete "messages (WAP)," and insert -- (WAP) messages, --, therefor.

In Column 23, Line 48, delete "extensible (xHTML)," and insert -- extensible HTML (xHTML), --, therefor.

In the Claims

In Column 26, Line 21, in Claim 16, delete "media" and insert -- processor readable non-transitory storage media --, therefor.

In Column 26, Line 23, in Claim 17, delete "media" and insert -- processor readable non-transitory storage media --, therefor.

In Column 26, Line 27, in Claim 18, delete "media" and insert -- processor readable non-transitory storage media --, therefor.

In Column 26, Line 31, in Claim 19, delete "media" and insert -- processor readable non-transitory storage media --, therefor.

In Column 26, Line 34, in Claim 20, delete "media" and insert -- processor readable non-transitory storage media --, therefor.

In Column 26, Line 36, in Claim 21, delete "media" and insert -- processor readable non-transitory storage media --, therefor.